US011688223B2

(12) United States Patent
Poliner et al.

(10) Patent No.: US 11,688,223 B2
(45) Date of Patent: Jun. 27, 2023

(54) ITEM MANAGEMENT, SYSTEMS AND METHODS

(71) Applicant: POLYTEX TECHNOLOGIES LTD., Caesarea (IL)

(72) Inventors: Tomer Poliner, Caesarea (IL); Etgar Marcus, Alloney Abba (IL)

(73) Assignee: POLYTEX TECHNOLOGIES LTD., Caesarea (IL)

( * ) Notice: Subject to any disclaimer, the term of this patent is extended or adjusted under 35 U.S.C. 154(b) by 21 days.

(21) Appl. No.: 17/187,816

(22) Filed: Feb. 28, 2021

(65) Prior Publication Data
US 2021/0272409 A1    Sep. 2, 2021

Related U.S. Application Data

(60) Provisional application No. 62/983,694, filed on Mar. 1, 2020.

(51) Int. Cl.
*G07F 9/00* (2006.01)
*G07F 11/62* (2006.01)
*B25J 9/16* (2006.01)
*G06K 7/10* (2006.01)

(52) U.S. Cl.
CPC .............. *G07F 9/006* (2013.01); *G07F 11/62* (2013.01); *B25J 9/16* (2013.01); *G06K 7/10297* (2013.01)

(58) Field of Classification Search
CPC . G07F 9/006; G07F 11/62; B25J 9/16; G06K 7/10297
See application file for complete search history.

(56) References Cited

U.S. PATENT DOCUMENTS

| 7,474,938 | B2 * | 1/2009 | Poliner | G07F 11/14 221/9 |
| 7,809,470 | B2 * | 10/2010 | Shoenfeld | G08B 13/2402 221/133 |
| 8,751,035 | B2 * | 6/2014 | Janet | G07F 9/002 700/229 |
| 8,875,942 | B2 | 11/2014 | Poliner | |
| 9,208,635 | B2 * | 12/2015 | Fitzgerald | A47F 1/04 |
| 10,843,878 | B2 * | 11/2020 | Ukisu | B65G 47/905 |
| 2004/0026442 | A1 * | 2/2004 | Hutchinson | B65B 5/103 221/123 |
| 2004/0034447 | A1 * | 2/2004 | Vollm | G07F 11/54 700/235 |
| 2004/0128025 | A1 * | 7/2004 | Deal | G06Q 10/06 700/236 |

(Continued)

FOREIGN PATENT DOCUMENTS

EP      2378495 A1    10/2011

*Primary Examiner* — Michael Collins
(74) *Attorney, Agent, or Firm* — The Roy Gross Law Firm, LLC; Roy Gross

(57) ABSTRACT

Provided herein are automated article dispensing systems having inventory management capabilities, and methods for managing inventory of articles in automated dispensing systems. In particular, the systems and methods disclosed herein utilize an inventory management assembly which includes one or more sensors configured to detect directly or indirectly one or more parameters related to quality and/or quantity the articles and an inventory management processing module configured to compute inventory related data based at least on the one or more parameters.

19 Claims, 6 Drawing Sheets

(56) References Cited

U.S. PATENT DOCUMENTS

| | | | | |
|---|---|---|---|---|
| 2004/0254676 | A1* | 12/2004 | Blust | G06Q 10/087 |
| | | | | 700/231 |
| 2005/0113968 | A1* | 5/2005 | Williams | G07F 11/44 |
| | | | | 700/236 |
| 2006/0207995 | A1* | 9/2006 | Erwin | G07F 11/62 |
| | | | | 221/211 |
| 2006/0217836 | A1* | 9/2006 | Poliner | G07F 7/06 |
| | | | | 700/237 |
| 2012/0130534 | A1* | 5/2012 | Wurm | G07F 17/0092 |
| | | | | 700/236 |
| 2013/0204432 | A1* | 8/2013 | Panetta | B65B 57/20 |
| | | | | 700/231 |
| 2014/0172161 | A1* | 6/2014 | Norris | G07F 11/005 |
| | | | | 700/237 |
| 2014/0236349 | A1* | 8/2014 | Bae | B65B 57/14 |
| | | | | 700/236 |
| 2016/0304280 | A1 | 10/2016 | Elazary et al. | |
| 2018/0141211 | A1 | 5/2018 | Wellman et al. | |
| 2018/0215545 | A1 | 8/2018 | High et al. | |

\* cited by examiner

ITEM MANAGEMENT, SYSTEMS AND METHODS

TECHNICAL FIELD

The present disclosure relates generally to systems and methods for inventory management of items placed and dispensed from a dispensing system.

BACKGROUND OF THE INVENTION

Automated dispensing systems, such as vending machines are used to automatically dispense various items and articles, such as, clothing, food, beverage, towels, newspapers, and the like. The size and mode of operation of the dispensing systems vary based on their intended use and the type of items dispensed. For example, clothes or garment dispensing systems may include suitable mechanical means for selecting, holding and dispensing suitable clothing item(s) that may be dispensed to a user based on the preferences of the user which may be predetermined or adjusted in real time. For example, U.S. Pat. No. 7,474,938 is directed to interactive automated article dispensing system. For example, U.S. Pat. No. 8,875,942 is directed to Side-grip method for grasping textile items in a vending machine.

However, even if interactive, automated dispensing systems do not inherently allow real time management of the various items dispensed by the system and do not provide indication as to the real time quality and/or quantity of the items stored, dispensed and/or returned to the system, to improve inventory management.

Thus, there is a need in the art for automated dispensing systems that include item management and control, preferably in real time, and to further provide indication as to various quantity and quality parameters of the stored or dispensed items, to allow improved management of the inventory of the dispensed items.

SUMMARY OF THE INVENTION

Aspects of the disclosure, according to some embodiments thereof, relate to automated dispensing systems having item management capabilities that allow identifying, in real time, various quantity and/or quality parameters related to the dispensed items to allow improved control and/or management of the items being dispensed by the system. More specifically, but not exclusively, aspects of the disclosure, according to some embodiments thereof, relate to interactive automated dispensing systems for dispensing various kinds of clothing articles or items to users, wherein the systems further allow real-time management of various parameters related to the items, including quantity parameters (such as, total number of items, total number of each type of item, number of items in various compartments of the system, etc.); and/or quality parameters (such as, size of items, colors of items, number of times the items have been used, condition of the items etc.), to further allow control of the specific dispensed items, based on one or more of the parameters.

Thus, according to an aspect of some embodiments, there is provided an automated article dispensing system having inventory management capabilities, which includes: a plurality of storage compartments configured for storage of articles, wherein the storage compartments arranged in a plurality of columns and a plurality of tiers or rows; a gripper assembly which includes at least one gripper movable between the storage compartments, wherein the at least one gripper is configured to reach a storage compartment, to retrieve an article therefrom and to deliver said article to a dispensing outlet (for example, via a chute); and an advantageous inventory management assembly which includes: a suitable sensor configured to directly or indirectly detect one or more parameters related to quality and/or quantity of the articles in said one or more storage compartments; and an inventory management processing module which is configured to compute inventory related data based at least on said one or more parameters and, based on said inventory related data, to provide instructions to said gripper assembly to reach a selected compartment, retrieve the article therefrom and deliver said article to the dispensing outlet.

According to some embodiments, there is provided an automated article dispensing system having inventory management capabilities, the system includes:

a plurality of storage compartments configured for storage of articles, the storage compartments arranged in a plurality of columns and a plurality of tiers;

a gripper assembly including at least one gripper movable between said storage compartments, said at least one gripper is configured to reach a storage compartment, to retrieve an article therefrom and to deliver said article to a dispensing outlet; and an inventory management assembly which includes:
one or more sensors configured to directly or indirectly detect one or more parameters related to quality and/or quantity of the articles in said one or more storage compartments; and
an inventory management processing module configured to compute inventory related data based at least on said one or more parameters and, based on said inventory related data, to provide instructions to said gripper assembly to reach a selected compartment, retrieve the article therefrom and deliver said article to the dispensing outlet.

According to some embodiments, the one or more sensors may be selected from a spatial sensor, a temporal sensor, a visual sensor, a weight sensor and an RFID sensor. Each possibility is a separate embodiment. According to some embodiments, the one or more sensors may be fixed or movable.

According to some embodiments, the spatial sensor may be selected from one or more encoders, a servomotor and a step motor. Each possibility is a separate embodiment.

According to some embodiments, the temporal sensor may include one or more timers. According to some embodiments, the visual sensor may include one or more cameras, such as, CMOS and CCD camera. According to some embodiments, the weight sensor may include one or more digital scales.

According to some embodiments, the RFID reader may include one or more RFID antennas, selected from high frequency and low frequency RFID antennas.

According to some embodiments, the said gripper assembly may include one or more motors, one or more controllers, one or more gripper units, one or more arms, or any combinations thereof. Each possibility is a separate embodiment.

According to some embodiments, the system may further include a user interface. According to some embodiments, the system may further include one or more controllers, one or more processors, or both. According to some embodiments, the system may further include a communication unit.

According to some embodiments, the system may be functionally or physically associated with an item retrieval unit.

According to some embodiments, the quality parameters may include such parameters as, but not limited to: type of an item, size of an item, color of an item, condition of an item, defects in an item, frequency of use of an item, life cycle of an item, or any combination thereof. Each possibility is a separate embodiment.

According to some embodiments, the quantity parameter may include parameters as, but not limited to: amount of an item in a compartment, amount of an item in a plurality of compartments, amount of item in the entire plurality of compartments, or any combination thereof. Each possibility is a separate embodiment.

According to some embodiments, the inventory management assembly may be further configured to provide indication to a user regarding inventory parameters of articles stored and/or dispensed from the dispending system.

According to some embodiments, the inventory management assembly may be further configured to compute and provide indication regarding usage parameters of a specific user or a group of users.

According to some embodiments, the dispensing system may be further configured to communicate with one or more automated dispensing units by wired or wireless routes.

According to some embodiments, the system may be configured to restrict or limit item dispensing based on the determined inventory of said item and/or based on user characteristics.

According to some embodiments, there is provided a method for managing inventory of articles in an automated dispensing system, the method includes:
- detecting by one or more sensors of an inventory management assembly of the dispensing system, one or more parameters related to quality and/or quantity of articles stored and/or dispensed from one or more storage compartments;
- computing, by an inventory management processing module, inventory related data based at least on said one or more parameters; and
- providing instructions to a gripper assembly comprising at least one gripper movable between said one or more storage compartments, to reach a selected compartment, retrieve an article therefrom and deliver said article to the dispensing outlet.

According to some embodiments, the method may further include providing one or more indications regarding quality and/or quantity inventory of the items.

According to some embodiments, the detecting by the sensors may be performed directly or indirectly.

According to some embodiments, the method may further include computing and providing indication regarding usage parameters of a specific user or a group of users.

According to some embodiments, the method may further include restricting or limiting dispensing of an item based on the determined inventory of said item and/or based on user characteristics.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the figures.

DETAILED DESCRIPTION OF THE INVENTION

Figure 1:
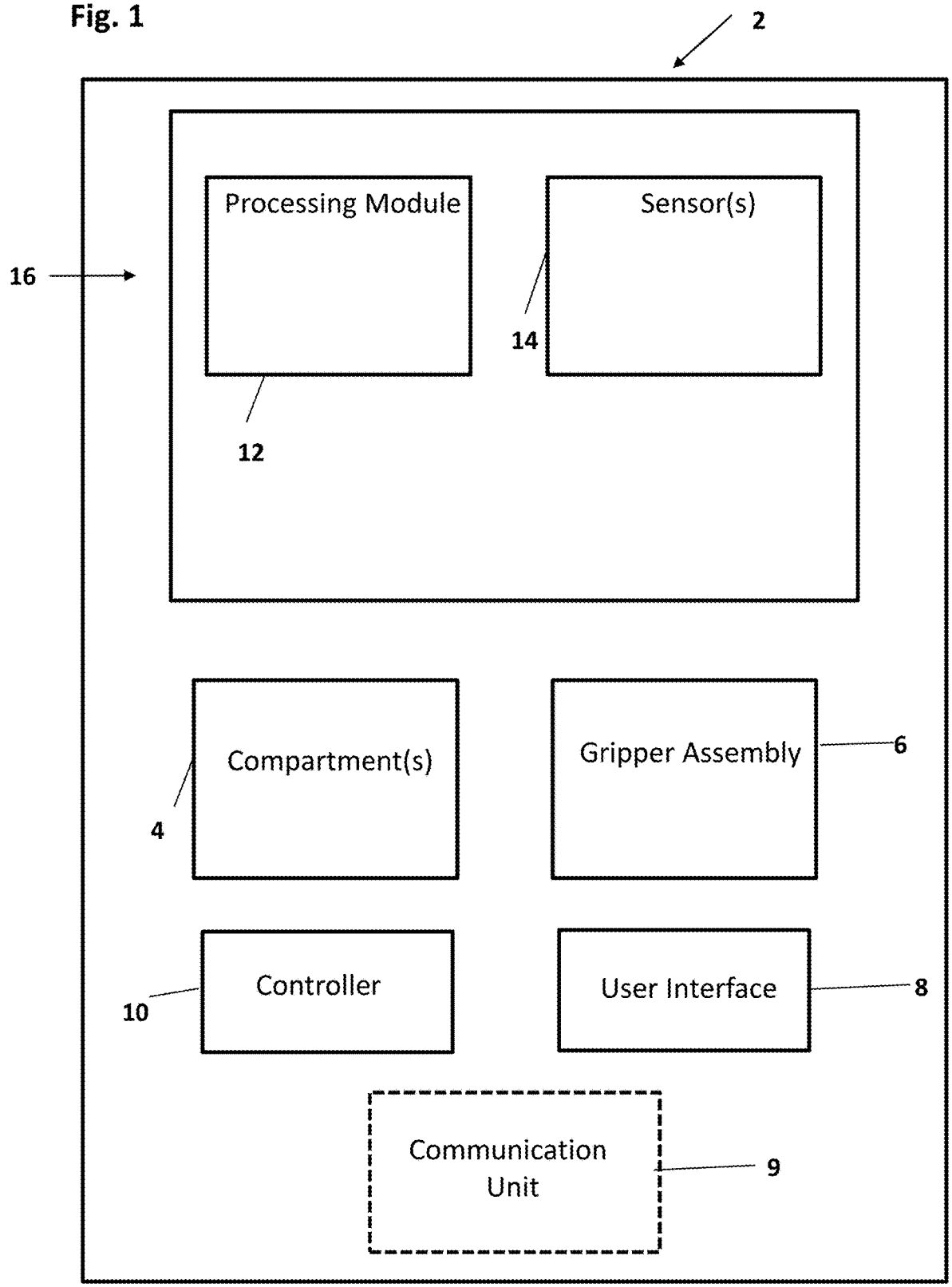
FIG. 1—A block diagram of automated dispensing system with inventory management assembly, according to some embodiments.

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the following description, various aspects of the invention will be described. For the purpose of explanation, specific details are set forth in order to provide a thorough understanding of the invention. However, it will also be apparent to one skilled in the art that the invention may be practiced without specific details being presented herein. Furthermore, well-known features may be omitted or simplified in order not to obscure the invention.

According to some embodiments, there is provided an advantageous article dispensing system having inventory management module, configured to detect and provide indication(s) regarding various quality and/or quantity parameters of the dispensed items to allow an improved and accurate inventory management, preferably in real-time.

In some embodiments, the articles dispensed may include any type of item, such as, for example, flexible products, newspapers, textile items, including any type of clothing, such as, garments, pants, shirts, scrubs, and the like, or any combination thereof. In some embodiments, the articles are textile items, such as, for example, but not limited to: garments, pants, shirts, scrubs, gowns, robes, towels, and the like, or any combination thereof. Each possibility is a separate embodiment.

Reference is now made to FIG. 1, which depicts a block diagram of automated dispensing system with inventory management assembly, according to some embodiments. As shown in FIG. 1, dispensing system 2 includes at least one or more compartments/cells 4. As further detailed below, the compartments are configured to hold/store various items to be dispensed. The compartments may be arranged in the any desired arrangement, such as, in rows and/or columns. The compartments may be similar or different as to size, shape, volume, capacity, and the like of. Each of the compartments may be capable of including/storing/holding one or more articles that may be stored in any desired orientation, such as, for example, in vertical stacks. In some embodiments, the articles may be any type of items, such as, for example, flexible products, textile, newspapers, any type of clothing, including, garments, pants, shirts, scrubs, and the like, or any combination thereof. In some embodiments, the articles (such as, for example, cloths) may be folded or un-folded and may be stored as is, or in a suitable bag or cover. In some embodiments, the items stored in each compartment may be similar, identical or different with respect of quantity (such as number) and/or quality (such as, type, size, color, number of times the item has been used, condition of the item, defects in the item, and the like, or any combination thereof). In some embodiments, the items stored in each row or column may be similar, identical or different with respect of quantity and/or quality. The system further includes a user interface 8, which allows a user to interact with the system, for example, by indicating a desired item to be retrieved. The user interface may include any type of user interface, including, for example, but not limited to: keyboard, monitor, screen, display, touch-screen, vocal activated interface, and the like. The user interface can interact with a controller 10 (having one or more processors and/or actuators), which is configured to control the operation of gripping assembly 6, to allow retrieving (picking up and dispensing) selected item(s) from a corresponding compartment. Gripping assembly 6 includes a gripper unit, configured to allow gripping an item, and optionally one or more motors, arms, moving platform(s), and the like, as further detailed below. The system may further include an optional communication unit 9, configured to allow communication of the system with any other systems and/or any other external units, via any suitable wired or wireless route. In some embodiments, the dispensing system may include, or be associated with a returning unit. Additionally, the system includes an inventory management assembly 16, which allows determining various quality and/or quantity parameters related to the items stored in the various compartments, to provide various inventory management capabilities, as further detailed herein. Inventory management assembly 16 includes one or more sensors 14, used (directly or indirectly) to determine one or more parameters related to the items stored in the compartments. In some embodiments, exemplary sensors may include, for example, but not limited to: spatial sensors, temporal sensors, visual sensors, weight sensors, remote sensors, such as RFID sensors, and the like, or any combinations thereof. In some embodiments, the sensors may include, for example, a timer, an optical imager, such as a camera, a motor and encoder, servomotor, step motor, scale, RFID antenna, and the like, or any combination thereof. Additionally, inventory management module 16 further includes an inventory management processing module 12, configured to compute inventory related data, based at least on the one or more sensed parameters and to optionally provide instructions to the gripper assembly (directly or indirectly, via interaction with controller 10), to reach a selected compartment (or to avoid a selected compartment). The inventory management processing module may include one or more of: suitable processor(s) or processing unit(s), controller(s), memory unit(s), communication unit(s), and the like, or any combination thereof. In some embodiments, the inventory management module may optionally further include a display, a separate user interface, and/or a separate communication unit. In some embodiments, at least some of the various components, units and modules of the dispensing system are physically and/or functionally associated. Each possibility is a separate embodiment.

Figure 2:
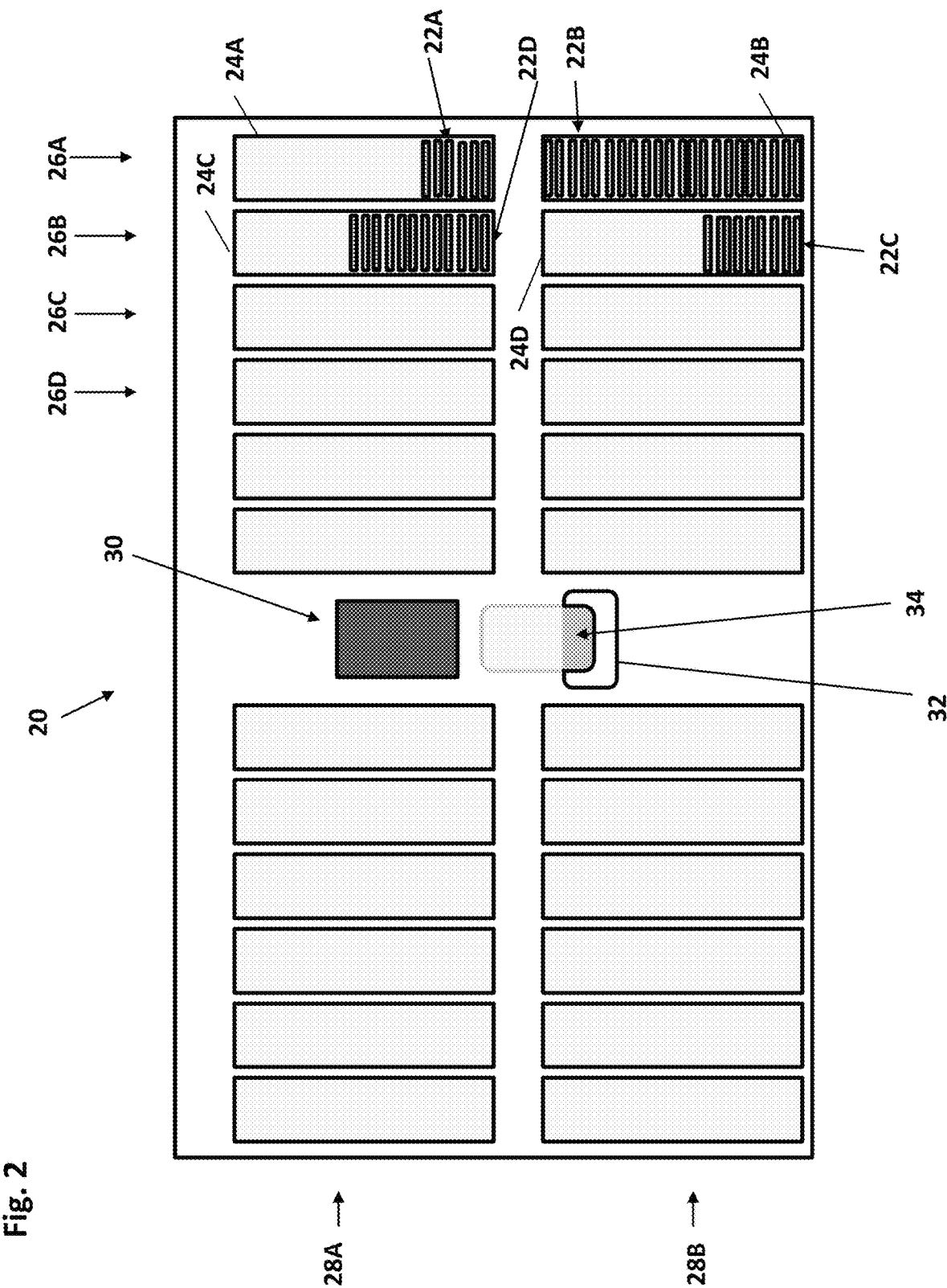
FIG. 2—A schematic depiction of portions of automated dispensing system, according to some embodiments.

Reference is now made to FIG. 2, which schematically depicts portions of automated dispensing system, according to some embodiments. As shown in FIG. 2, system 20 includes a plurality of compartments/cells (represented as exemplary compartments 24A-D), which may be arranged in columns (such as exemplary columns 26A-D) and rows/tiers (shown as exemplary rows 28A-B). The cells/compartments may be similar or different with respect of size, shape, volume, capacity, and the like. Each of the cells may be capable of including/storing/holding one or more articles/items that may be stored in any desired orientation, such as, for example, in vertical stacks. Shown in FIG. 2 are exemplary stacks 22A-D, where each stack illustrated in FIG. 2 includes a different number of items. The items may be any type of items, such as, for example, any type of clothing, including, garments, pants, shirts, scrubs, and the like, or any combination thereof. In some embodiments, the garments may be folded or un-folded and may be stored as is, or in a suitable bag or cover. In some embodiments, the items stored in each compartment may be similar, identical or different with respect of quantity and/or quality. In some embodiments, the items stored in each row or column may be similar, identical or different with respect of quantity (such as number) and/or quality (such as, type, size, color, number of times the item has been used, and the like, or any combination thereof). As shown in FIG. 2, system 20 further includes a user interface 30, which allows a user to interact with the system, for example, by indicating a desired item to be retrieved, as further detailed herein. The user interface may include any type of user interface, including, for example, but not limited to: keyboard, display, touch-screen, vocal activated interface, and the like. The user interface can interact with the dispensing system processor and controller (not shown), which is configured to control the operation of a gripping assembly (not shown) to allow retrieving of selected item(s) from a corresponding storage location, as well as with the inventory management assembly of the system (not shown), as detailed herein. As shown in FIG. 2, system 20 further includes an opening (dispensing outlet) 32, through which an item (such as exemplary item 34) that has been retrieved from its storage location in a compartment is being dispensed from the system, for example via a suitable chute (not shown), through outlet 32, to be accessible a user. In some embodiments, the system further includes an item management assembly (not shown) and optional communication unit (that may be a separate unit or be part of the controller/processor unit). The system further includes front cover(s), such as panels or doors (not shown in FIG. 2), for maintaining closed compartments. In some embodiments, system 20 may be in the form of a cabinet or cupboard having one or more compartments/cells, as detailed above.

According to some embodiments, the automated dispensing systems disclosed herein include an inventory management assembly, which includes, inter alia, one or more sensors to determine (directly or indirectly) various parameters related to the items stored in the various compartments, as further detailed herein.

Figure 3:
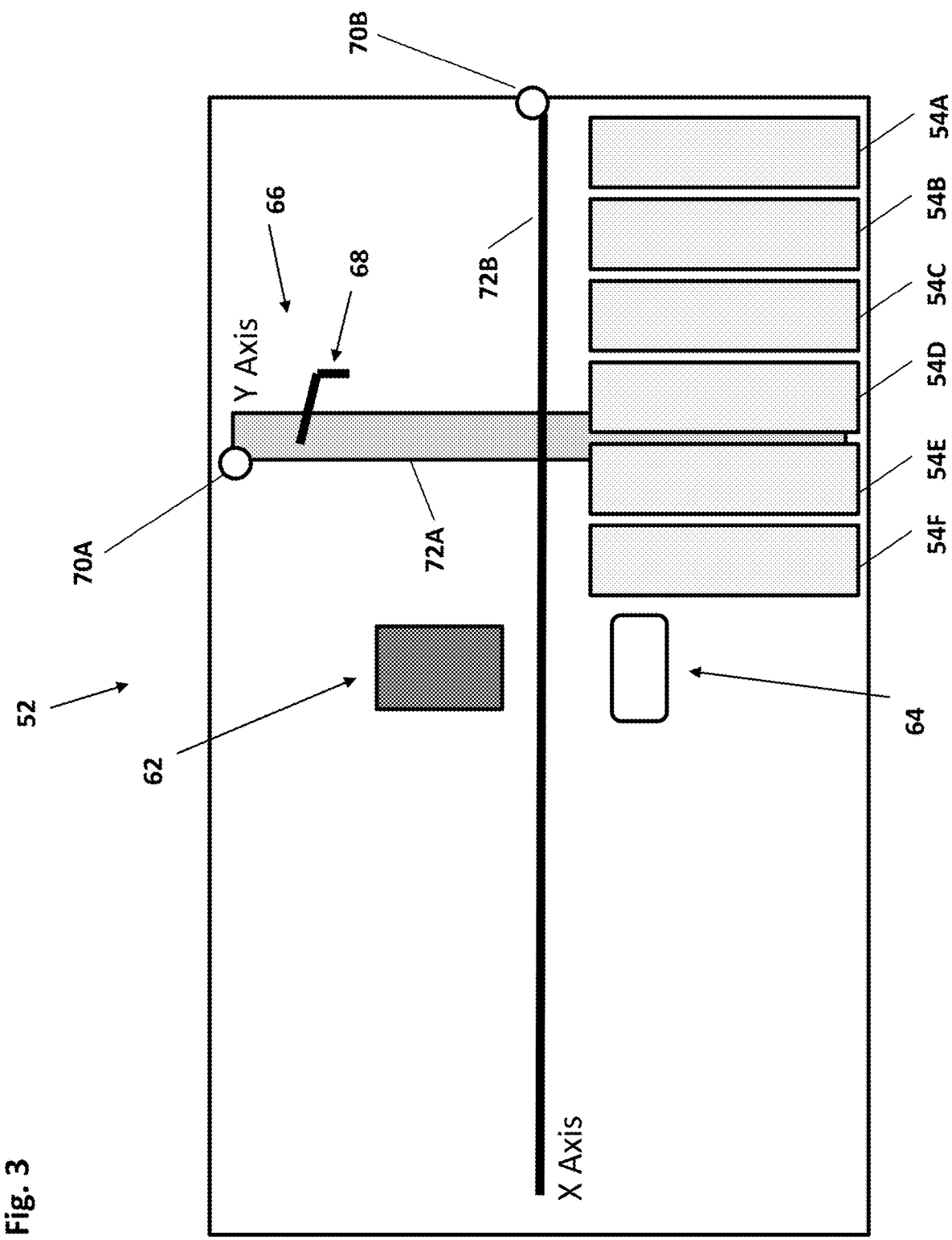
FIG. 3—A schematic illustration of portions of automated system for dispensing items having an inventory management assembly, according to some embodiments.

Reference is now made to FIG. 3, which is a schematic illustration of portions of automated system for dispensing items having an inventory management assembly, according to some embodiments. The system 52 shown in FIG. 3 is similar in general structure to the system 20, as illustrated in FIG. 2. As shown in FIG. 3, system 52 includes a plurality of compartments/cells (exemplary compartments 54A-F are shown) capable of including/storing/holding one or more articles/items (now shown), wherein the compartments may be arranged in rows and/or columns. Further shown is user interface 62 which allows a user to interact with the system. Also shown is outlet (opening) 64, through which an item that has been retrieved/removed/gripped from its storage location in a compartment is dispensed from the system. Further shown is gripper assembly 66. Gripper assembly 66 includes one or more functional units, including gripper unit 68, configured to interact with an item, by holding/griping the item, retrieving it from its storage location and dispensing the item (by releasing it, for example, via a suitable chute (not shown)), such that the item can exit via outlet opening 64. The gripper assembly allows movement of the gripper unit along any desired direction, such as, along the X-Axis and/or along the Y-Axis, to allow the gripper to reach any desired spatial location, such as, a specific compartment. The gripper assembly may include one or more means for moving the gripper unit, such as, one or more suitable motors (not shown), one or more moving platforms/arms or tracks, one or more controllers, and the like, which ultimately allow the control of the movement of the gripper unit to direct the gripper to a specific location. In some embodiments, the gripper unit is situated on a moving arm. In some embodiments, the gripper assembly may include horizontal and/or vertical arms or tracks, along which the gripper unit can move, for example, by a motor driven belt or any other suitable means. In some embodiments, the system includes an inventory management assembly allowing, inter alia, to determine various quality and/or quantity parameters related to the items stored and dispensed. For example, the sensor(s) may allow determining the amount of items in specific compartments based on accurate determination of the spatial and/or temporal parameters of the gripper unit, whereby based on these parameters (such as, the exact location of the gripper in a compartment relative to the item stack height, or the time for reaching an item a compartment), the amount of items in a compartment may be determined/computed. In some embodiments, as illustrated in FIG. 3, the system can include one or more sensors of the inventory management assembly, which are implemented as encoders, shown as encoders 70A-70B. Encoders 70A-70B may be located/placed on each of the vertical and horizontal arms (72A-B), opposite side of corresponding motors (not shown), which are driving the gripper unit along the designated axes to reach a designated location. In some embodiments, the use of such one or more encoders allows the accurate determination of the spatial location/position of the gripper unit. By determining the exact spatial location of the gripper unit, and based on the expected stack size (i.e., height, volume, or any other desired parameter), relative to the number of items in a compartment, the number of items in a compartment may be determined by the inventory management assembly (in particular, by the processing module thereof). For example, for a specific compartment capable of storing items of type A, if the expected stack height of B numbers of items A is C, based on the determination of the spatial location of the gripper unit by the sensors (for example, in the form of encoders) of the inventory management assembly, the actual stack height in that compartment may be determined and the number of items in the compartment may be calculated/computed (for example by the processing module). In some embodiments, the data regarding the identified parameters may be conveyed (for example, by displaying or otherwise alerting) to a user and may be used to determine the inventory of items in each compartment and in a plurality of compartments. In some embodiments, the identified parameters may further be used to control/maneuver the gripping assembly to reach specific compartments, based on said data.

In some embodiments, suitable encoders may be used with any type of suitable motors, such as, AC motors, DC motors, and the like. In some embodiments, the motors may be selected from brushless and brushed motors. In some embodiments, the motors may be selected from: AC induction motors, brushless AC motors, AC motors with permanent magnetic fields, and the like. In some embodiments, the encoders may be selected from rotary and linear encoders. In some embodiments, the encoders are used in conjunction with corresponding AC motors.

In some embodiments, alternatively or in addition to using separate encoders as described above, the sensor(s) used to allow determining the amount of items in specific compartments based on accurate determination of the spatial parameters of the gripper unit, may include step motors or servomotors. Servomotors as used herein may include any type of rotary actuator or linear actuator that allows for precise control of angular or linear position, velocity and/or acceleration of the gripper unit. Use of such controlled based motors allows determining the accurate spatial location/position of the gripper unit. As detailed above, by determining the exact spatial location of the gripper unit, and based on the expected stack size (i.e., height, volume, or any other desired parameter), relative to the number of items in a compartment, the number of items in a compartment may be determined by the inventory management assembly (in particular, by the processing module thereof), as detailed above.

In some embodiments, the sensor(s) of the inventory management assembly used to allow determining the amount/number of items in specific compartments may utilize accurate determination of the temporal parameters of the gripper unit. In such embodiments, the timing of the gripper reaching an item in a specific compartment may be used to determine/calculate/compute the amount of items in the compartment. To this aim, the sensor may include a dedicated timer that may measure/determine the exact time it takes for the gripper unit to reach an item (for example, the top item in the stack). In some embodiments, the timer may operate in conjunction with the operation of the gripper assembly. Based on this time (temporal) determination, the corresponding number of items in the specific compartment may thus be computed/calculated. For example, the lower the number of items in a compartment, the longer the time it would take the gripper to reach an item in the stack, and based on the identity/characteristics of the items in the compartments, the actual number of items in the compartment may be determined by the inventory assembly processing module.

In some embodiments, the sensor(s) of the inventory management assembly used to allow determining the amount of items in specific compartments may utilize a scale sensor to determine the weight of the stack of items in a compartment. In such embodiments, the weight of the stack of items in a specific compartment may be used to determine/calculate/compute the amount of items in that compartment. To this aim, the sensor may include a dedicated scale (such as a digital scale) that may measure/determine the weight of the stack of items in a compartment. In some embodiments, the scale may operate in conjunction with the operation of the gripper assembly. Based on this measured weight, the corresponding number of items in the specific compartment may thus be computed/calculated.

According to some embodiments, the inventory management assembly may include one or more imaging/optical sensors for determining quality and/or quantity parameters related to the items stored and dispensed by the systems disclosed herein.

Figure 4:
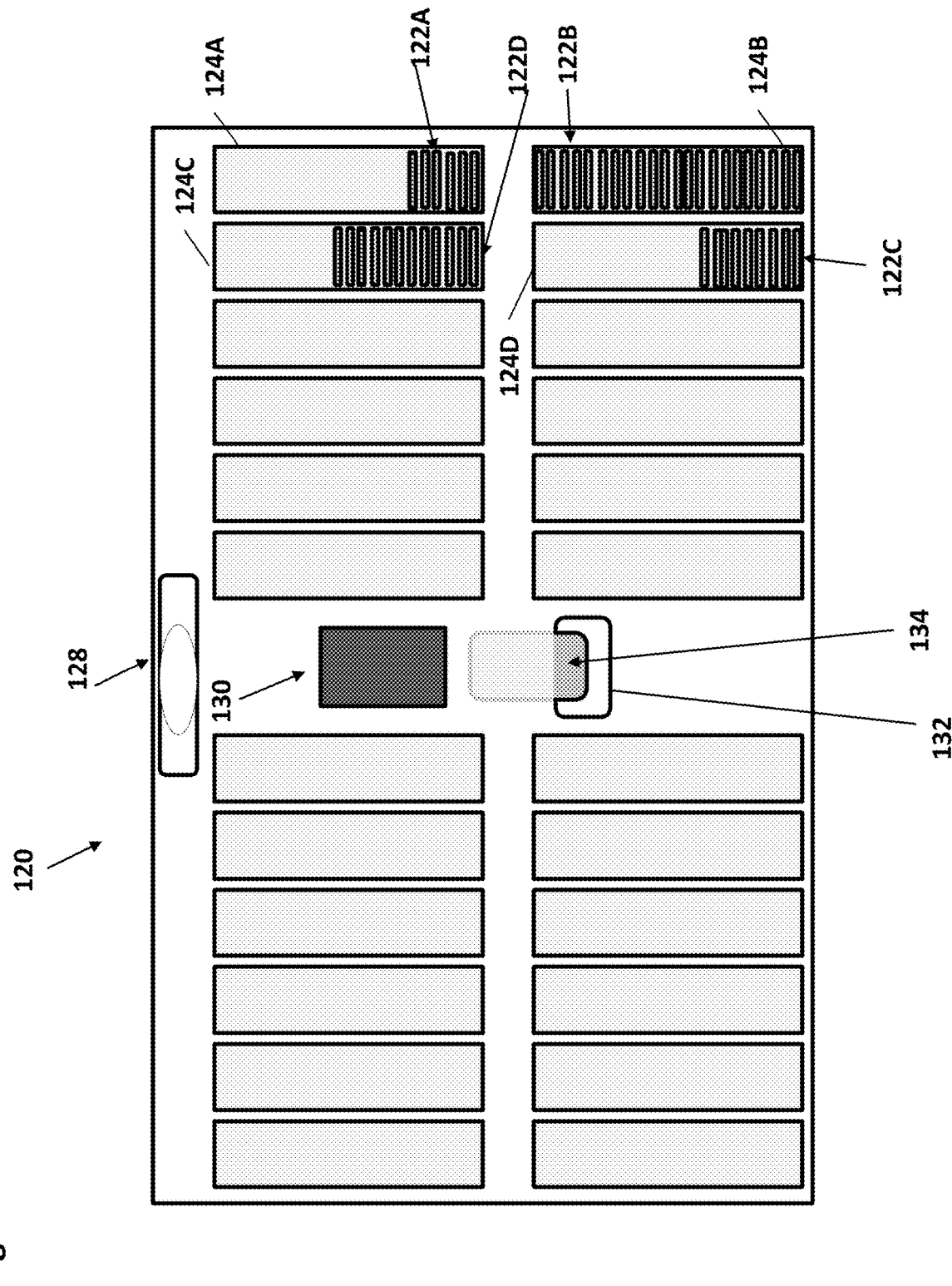
FIG. 4—A schematic illustration of portions of automated system for dispensing items having an inventory management assembly with optical sensors, according to some embodiments.

Reference is now made to FIG. 4, which is a schematic illustration of portions of automated system for dispensing items having an inventory management assembly with optical sensors, according to some embodiments. System 102 shown in FIG. 4, is basically similar in structure to system 20, illustrated in FIG. 2. As shown in FIG. 4, system 120 includes a plurality of compartments/cells (represented as exemplary compartments 124A-D). The cells/compartments may be similar or different with respect of size, shape, volume, capacity, and the like. Each of the cells may be capable of including/storing/holding one or more articles/items that may be stored in any desired orientation, such as, for example, in vertical stacks. Shown in FIG. 4 are exemplary stacks 122A-D, wherein each stack shown includes a different number of items. As detailed above, the items may be any type of items, such as, for example, any type of clothing. In some embodiments, the garments may be folded or un-folded and may be stored as is, or in a suitable bag, cover or holder. In some embodiments, the items stored in each compartment may be similar, identical or different with respect of quantity (such as number) and/or quality (such as, type, size, color, number of times the item has been used, and the like, or any combination thereof). In some embodiments, the items stored in each row or column may be similar, identical or different with respect of quantity and/or quality. As shown in FIG. 4, system 120 further includes a user interface 130, which allows a user to interact with the system, for example, by indicating a desired item to be retrieved. The user interface interacts with the system processor and controller, which is configured to control the operation of the gripping assembly (not shown) to allow retrieving of selected item(s) from a corresponding storage location, as detailed above. The system processor and controller may further interact with the inventory management assembly of the system. System 120 further includes an opening (outlet) 132, through which an item (such as exemplary item 134) that has been retrieved from its storage location in a compartment is dispensed from the system. In some embodiments, as illustrated in FIG. 4, the inventory management assembly may include one or more optical or imaging sensors, shown as exemplary sensor 128. The optical sensors utilized may include any type of imaging apparatus or camera, such as, for example, CMOS, CCD, and the like. In some embodiments, the optical sensor may include any type of lens associated with a suitable optical detector. In some embodiments, each compartment may have a separate, dedicated optical sensor, providing an image of the compartment, located/positioned such that it allows providing an image (or series of images, such as, a video) of the content of the compartments. In some embodiments, at least one of the compartments include an optical sensor. In some embodiments, the optical sensor(s) are stationary (i.e., they do not move along an X-Axis or Y-Axis). In some embodiments, the optical sensors may be located/positioned on one or more moving platform allowing the movement of the optical along any desired direction to provide an image of any compartment. In some embodiments, one or more optical sensors may be placed/positioned on the gripper assembly, whereby the optical sensor may move in conjunction with the gripper unit, providing an image of the compartment in which the gripper is placed. In some embodiments, any such combination of placement/positioning of one or more optical sensors may be utilized, to provide maximal optical coverage of the compartment. In some embodiments, the images (or video) obtained by the optical sensor may be used to determine quantity parameters (for example, number) of the items in a compartment. In some embodiments, the images (or video) obtained by the optical sensor(s) may be used to determine quality parameters of the items in a compartment, including, for example, but not limited to: color, size, integrity, and the like, or any combination thereof. In some embodiments, any of the parameters may be determined by the processing module of the inventory management assembly, for example by utilizing suitable imaging processing algorithms. The data regarding the identified items parameters may be conveyed to a user and may be used to determine the inventory quantity and/or quality of items in each compartment and in a plurality of compartments. In some embodiments, the identified parameters may further be used to control/maneuver the gripping assembly to reach specific compartments, based on said data. For example, if it has been determined that a specific compartment includes a defected item, the griping assembly may be directed to a different compartment. Likewise, if it has been determined that a specific compartment has an inventory which is equal to or less than a threshold (wherein the threshold value can be predetermined, automatically determined or manually determined) a suitable alert/indication may be issued and accordingly, the gripper assembly may be directed to a different compartment.

According to some embodiments, the inventory management assembly may utilize Radio-Frequency (RF) means as sensors to detect and identify various quantity and/or quality parameters of the items stored and dispensed by the automated dispensing systems. In some embodiments, the inventory management assembly may utilize RFID means to monitor and determine the quantity and/or quality parameters of the items. In some embodiments, the inventory management assembly may include one or more RFID readers (antennas) of various intensities. The RFID reader may be placed/located in various regions of the dispensing system. For example, in some embodiments, the RFID antennas may be located in close proximity to the outlet opening of the system, through which the items are dispensed. For example, the RFID antenna may be placed/located in the chute of the dispensing system. In some embodiments, placing the RFID reader in the chute or in any other close proximity to the outlet opening is advantageous, as only items that have been actually dispensed are detected. This may be achieved due to the close physical proximity between the RFID antenna and the item (which includes a corresponding RFID tag). In some embodiments, the RFID reader may be placed in or in close proximity to one or more compartments. In such instances, when an item (having a corresponding RFID tag) is gripped it is moved in close proximity to the RFID reader, in particular, if the item is gripped and moved vertically, in relation to the RFID reader.

In some embodiments, a central RFID reader may be located/positioned in the system, at any desired position (not necessarily in the chute or in close proximity to the outlet), which can read/identify the entire content of items (having an RFID tag) stored in the dispensing system. In some embodiments, the RFID reader may be stationary. In some embodiments, the RFID reader may be moveable. In some embodiments, a combination of stationary and moveable RFID readers may be used. In some embodiments, the RFID reader may be moveable by one or more arms or moving platforms, that can allow changing the location of the RFID reader. In some embodiments, the RFID reader may be placed on or in close proximity to the gripper assembly and may optionally move in coordination with the gripper unit. In some embodiments, the use of moveable RFID reader allow the use of a smaller RFID reader (which may require less energy and is more cost effective), that may read/identify the tagged items and thereby determine inventory of the items in the various compartments.

In some embodiments, the inventory management assembly may further utilize dedicated algorithms for identifying a dispensed item, based on an RFID tag. In some embodiments, such algorithm may include a step of differentiating an item that is being dispensed from the items which remain stored in the dispensing system. In some embodiments, prior to reaching and gripping a requested item, RFID read of all the items stored in the system (in one, part or all of the compartments) is performed. That inventory may be marked as "stray", thereafter, when the item is gripped and brought in close proximity to the RFID reader, the "stray" inventory is ignored, to thereby identify only the specific item that is being read.

According to some embodiments, the inventory management assembly may further advantageously allow improved and ease of identification of an item when using RFID tags, as the management assembly can link an item type to a corresponding code, based on the prior knowledge of the item types/characteristics (for example, size, shirt/pants, color, gender, etc.) that are stored in a designated compartment, from which the retrieved item has been removed. By utilizing such linking capabilities, there is no need to encode/predefine/tag each item with a corresponding item code.

Figure 5:
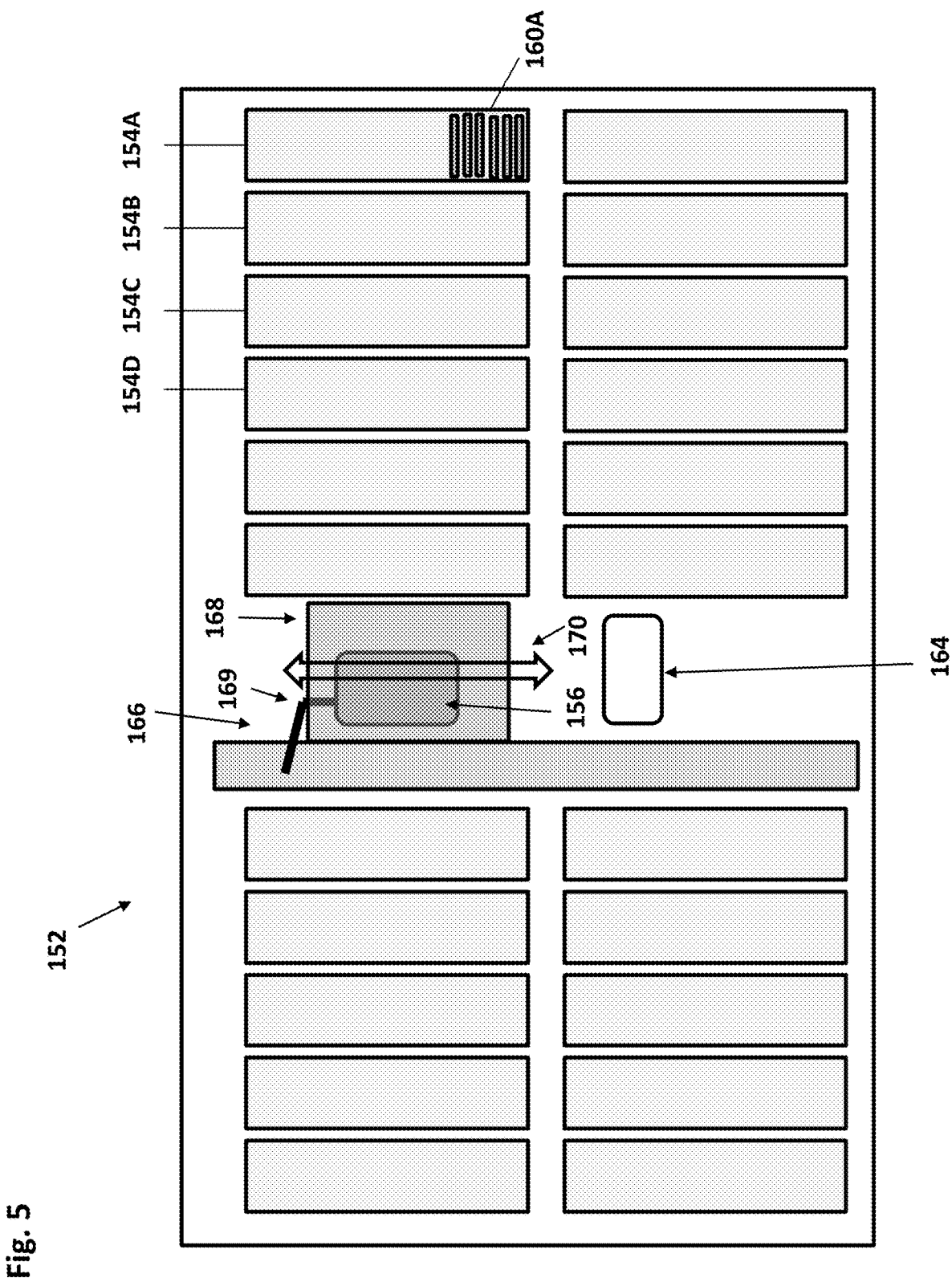
FIG. 5—A schematic illustration of portions of automated system for dispensing items having an inventory management assembly utilizing RFID means, according to some embodiments.

Reference is now made to FIG. 5, which is a schematic illustration of portions of automated system for dispensing items having an inventory management assembly utilizing RFID means, according to some embodiments. System 152 shown in FIG. 5, is basically similar in structure to system 20, illustrated in FIG. 2. As shown in FIG. 5, system 152 includes a plurality of compartments/cells (represented as exemplary compartments 154A-F, while omitting other compartments for simplicity of display). The cells/compartments may be similar or different with respect of size, shape, volume, capacity, and the like. Each of the cells may be capable of including/storing/holding one or more articles/items that may be stored in any desired orientation, such as, for example, in vertical stacks (shown as exemplary stack 160A). As detailed above, the items may be any type of items, such as, for example, any type of clothing. As shown in FIG. 5, system 152 further includes a user interface (not shown), which allows a user to interact with the system, for example, by indicating a desired item to be retrieved. The user interface interacts with the system processor and controller, which is configured to control the operation of the gripping assembly (166) to allow retrieving of selected item(s) from a corresponding storage location, as detailed above. Gripper assembly 166 includes several functional units, including gripper unit 169, configured to interact with an item, by holding/griping the item, retrieving it from its storage location and dispensing the item (by releasing it, for example, via a suitable chute), such that the item (shown as exemplary item 156) can exit via opening/outlet 164. As detailed above, the gripper assembly allows movement of the gripper unit along any desired direction, such as, along the X-Axis and/or along the Y-Axis, to allow the gripper to reach any desired spatial location, such as, a specific compartment. The gripper assembly may include one or more means for moving the gripper unit, such as, one or more suitable motors, one or more moving platforms/arms or tracks, one or more controllers, and the like, which ultimately allow the control of the movement of the gripper unit to direct the gripper to a specific location. In some embodiments, as illustrated in FIG. 5, the inventory management assembly may include an RFID reader (antenna) 168, which is placed in this example in the chute, in close proximity to outlet 164, such that when a dispensed item 156 is being dispensed, it is read by RFID reader 168. In some embodiments, if the item is not properly read/detected by the RFID antenna, it may be moved again in an upward-downward movement (arrow 170), until it is properly read and detected. In some embodiments, such identification of the dispensed item is more accurate and does not induce background readings of other items, which are still stored in the dispensing system, to thereby result in a more accurate inventory management system. As detailed above, the RFID reader may be any type of RFID reader, and it may be placed in various locations in the dispensing system. In some embodiments, more than one RFID readers may be used. In some embodiments, when using more than one RFID readers, such readers may be similar, identical or different with respect of size, intensity, power consumption, and the like, or any combination thereof.

According to further embodiments, the inventory management assembly disclosed herein can advantageously be used in conjunction with an item returning unit, which is a unit configured to return a used item. In some embodiments, the item returning unit may be functionally and/or physically associated with the automated dispensing system. According to some embodiments, the item returning unit may be integrally formed with the dispensing system. In some embodiments, the returning unit is an integral part of the dispensing system. In some embodiments exemplary embodiments, the item returning unit may include an RFID reader, for example, at the return opening, through which the item may be returned/inserted back into the returning unit. Advantageously, the inventory management unit may track various parameters related to the returned item. In some embodiments, by integrating data from inventory management assembly regarding the dispensing and/or returning of an item, various parameters regarding the item may be revealed, in particular with respect of the life cycle of the item and its condition. Such parameters may include, for example, but not limited to: number of times it has been refiled in the dispensing system; parameters related to the life cycle of the item, such as, number of times it has been dispensed, frequency of dispensing, number of laundries, time length of use (i.e., length of time from dispensing to returning), condition of the item, wear and tear of the item, and the like; parameters related to users of the item, such as, identity of users, timing of using and dispensing, timing of returning, damages incurred by a user, loss of items, and the like, or any combination thereof.

According to some embodiments, more than one automated dispensing systems may be at least partially integrated with respect of such data (or at least partially sharing such data), obtained by the inventory management assemblies of those systems, for example, by being connected to a central server, or by interacting/connecting to each other by any communication route, such as, for example, cellular, WI-FI, wired communication, and the like. By integrating such data between two or more systems, the accuracy of the data may be increased and may provide enhanced and improved item inventory management accuracy. In some embodiments, the at least partially integrated dispensing systems may be located in close proximity (for example in the same room or area), or in remote, discrete locations (for example, in two buildings).

According to some embodiments, the inventory management assembly may further allow displaying/presenting/communicating various inventory related data, including quality and/or quantity parameters regarding the items inventory. In some embodiments, an inventory management assembly of a system may further allow displaying/presenting/communicating various inventory related data, including quality and/or quantity parameters regarding the items inventory in: a single dispensing system, in one or more specific compartments of a single dispensing system, and/or in one or more dispensing systems sharing information. In some embodiments, such systems may further advantageously interact with external suppliers (such as laundry service or other suppliers) and provide indication regarding the inventory. For example, the inventory management assembly may allow communication or otherwise alerting a supplier that an item inventory is low.

According to further embodiments, the inventory management assembly may further advantageously allow to execute item dispensing limitations. Thus, based on the determined inventory of the item in the dispensing system and/or on predetermined or real-time determined rule(s), the inventory system may allow or reject dispensing of an item. In some embodiments, the item dispending limitation(s) may be determined based on general limitations or on limitations of a specific user. For example, item limitations may include specific users limitations, such as, how many items of which type can a user obtain in single use (i.e. single dispensing) or in more than one use (i.e. over a period of time). In some embodiments, limitations may be adjusted based on the specific characteristics of a user.

According to some embodiments, the inventory management assembly may further advantageously allow verification control of the item to be dispensed based on predetermined rules. In some embodiments, the inventory management assembly may allow verifying that only the correct type of item is dispensed to a user, based on the intended use of the specific item.

In some embodiments, information from the inventory management assembly may be advantageously shared with external environment, to improve safety and control. For example, if a specific environment requires specific clothing (such as a clean room environment requiring specific types of garment), the inventory management assembly that may interact with the specific environment can further allow preventing or allowing entrance to that environment (for example, by controlling the operation of the entrance (door)), based on the items provided to the user. If the user has retrieved the correct specific types of garment, entrance to the specific environment is allowed; otherwise, entrance may be prevented.

According to some embodiments, the inventory management assembly may further allow implementing one or more rules for dispensing items, wherein such rules may be predetermined by a user, or may be adjusted or determined in real time, during use. In some embodiments, such rules may include rules related to use of the dispensed items, such as, hygiene rules. This is of particular importance in working environments in which hygiene is highly important, such as, health care facilities, manufacturing facilities, and the like. In some embodiments, the inventory management assembly may further allow providing indication regarding the implementation of hygiene rules, for either an individual user or a group of users, for example, by generating a hygiene score. According to some embodiments, the hygienic rules with respect of garments may include, for example, the minimal number of uses of an item according to a predetermined thresholds, a maximal period of use time between items replacement; and the like or combinations thereof. According to some embodiments, the inventory management assembly may allow generating an individual hygiene score, based on the hygiene rules and further provide a user an indication regarding his individual hygiene score. According to some embodiments, the inventory management assembly may allow generating an individual hygiene score, based on the hygiene rules and further provide an indication regarding the users; individual hygiene score. According to some embodiments, the inventory management assembly may allow generating a hygiene score of more than one user (for example, a group of users), based on the hygiene rules and further provide an indication regarding the users hygiene score. In some embodiments, providing an indication may be performed, for example, by displaying the score on a display (such as a display of the user interface of the dispensing system or any other display on the dispensing system panel), communicating a message to the user (for example, an email, text message, SMS), and the like.

According to some embodiments, there is provided a method for managing inventory of articles in an automated dispensing system, the method may include one or more of the steps of:

detecting, for example, by a sensor of an inventory management assembly of the dispensing system, one or more parameters related to quality and/or quantity of the articles stored and/or dispensed from one or more storage compartments of the dispensing system;

computing, by an inventory management processing module, inventory related data based at least on said one or more parameters;

providing operating instructions to a gripper assembly which includes at least one gripper movable between the one or more storage compartments, to reach a selected compartment, retrieve an article therefrom and deliver said article to a dispensing outlet of the dispensing system, such that the item is reachable by a user;

optionally, further providing one or more indications based on the one or more parameters regarding quality and/or quantity of the inventory (including, for example, but not limited to: number and/or type of articles in each compartment; total number and/or type of articles; size; color; condition; turnover rate; length of use of items, frequency of use of items, and the like, or any combinations thereof);

optionally, further providing one or more indications based on the one or more parameters regarding specific users or groups of users (for example, by providing a hygiene score, as detailed above).

Figure 6:
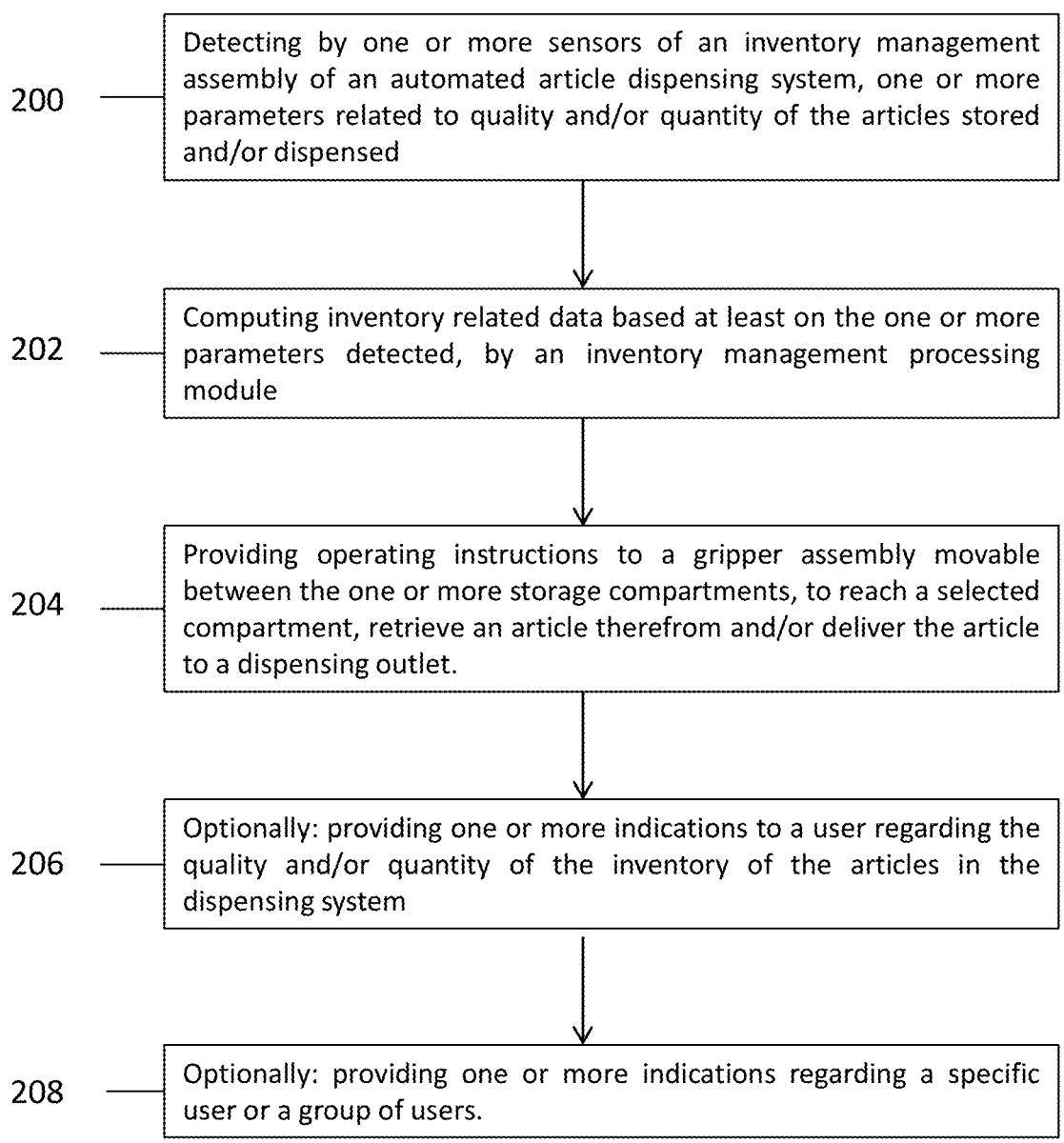
FIG. 6—A flow chart of steps in the method for managing inventory of articles in an automated dispensing system, according to some embodiments.

Reference is now made to FIG. 6, which illustrates steps in the method for managing inventory of articles in an automated dispensing system, according to some embodiments. As shown in FIG. 6, step 200 includes detecting, directly or indirectly, by one or more sensors of an inventory management assembly of an article dispensing system, one or more parameters related to quality and/or quantity of the articles. Next, at step 202, an inventory management processing module is used for computing inventory related data based at least on the one or more parameters detected in step 200. At step 204, operating instructions are provided to a gripper assembly (for example, to a controller thereof), which includes at least one gripper movable between the one or more storage compartments, to reach a selected compartment, retrieve an article therefrom and/or deliver said article to a dispensing outlet. In optional step 206, the method may further include a step of providing one or more indications to a user regarding the quality and/or quantity of the inventory of the articles in the dispensing system at any desired level of specificity (including, for example, in any compartment, a plurality of compartment, inventory in all compartments, and the like, or any combination thereof). Further, in optional step 208, the method may further include providing one or more indications regarding a specific user or a group of users, such as, for example, various statistics regarding the users (such as, frequency of use, period of use, types of items used, and the like), hygienic score of a user, and the like.

According to some embodiments, the inventory management assembly includes a processing module. According to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices. Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus. The processes and displays presented are not inherently related to any particular computer or other apparatus. Various general-purpose systems may be used with programs in accordance with the teachings herein, or it may prove convenient to construct a more specialized apparatus to perform the desired method(s). In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

What is claimed is:

1. An automated article dispensing system of textile items, having inventory management capabilities, the system comprising:

a plurality of storage compartments configured for storing and dispensing of textile items, said storage compartments arranged in a plurality of columns and a plurality of tiers;

a gripper assembly comprising at least one motor, at least one controller, at least one gripper unit, at least one arms, or any combinations thereof, wherein the at least one gripper is movable between said storage compartments, said at least one gripper is configured to reach a storage compartment, to retrieve a textile item therefrom and to deliver said textile item to a dispensing outlet; and an inventory management assembly comprising:
one or more sensors selected from a spatial sensor, a temporal sensor, a visual sensor, a weight sensor and an RFID sensor, said sensors are associated with the gripper assembly and/or with one or more of said storage compartments, and configured to directly or indirectly detect one or more parameters related to quality and/or quantity of said textile items in said one or more storage compartments; and an inventory management processing module configured to compute inventory related data based at least on said one or more parameters and, based on said inventory related data, to provide instructions to said gripper assembly to reach a selected compartment, retrieve the textile item therefrom and deliver said textile item to the dispensing outlet.

2. The system according to claim 1, wherein the one or more sensors are fixed or movable.

3. The system according to claim 1, wherein the spatial sensor is selected from: one or more encoders, a servomotor and a step motor.

4. The system according to claim 1, wherein the temporal sensor comprises one or more timers.

5. The system according to claim 1, wherein said visual sensor comprises one or more cameras, selected from CMOS and CCD camera.

6. The system according to claim 1, wherein the weight sensor comprises one or more digital scales.

7. The system according to claim 1, wherein the RFID reader comprises one or more RFID antennas, selected from high frequency and low frequency RFID antennas.

8. The system according to claim 1, wherein said gripper assembly comprises one or more motors, one or more controllers, one or more gripper units, one or more arms, or any combinations thereof.

9. The system according to claim 1, wherein the system further comprises a user interface, one or more controllers, one or more processors, a communication unit, or any combination thereof.

10. The system according to claim 1, functionally or physically associated with an item retrieval unit.

11. The system according claim 1, wherein the quality parameters comprises: type of an item, size of an item, color of an item, condition of an item, defects in an item, frequency of use of an item, life cycle of an item, or any combination thereof; and/or wherein the quantity parameter comprises: amount of an item in a compartment, amount of an item in a plurality of compartments, amount of item in the entire plurality of compartments, or any combination thereof.

12. The system according to claim 1, wherein the inventory management assembly is further configured to provide indication to a user regarding inventory parameters of textile items stored and/or dispensed from the dispensing system; and/or wherein the inventory management assembly is further configured to compute and provide indication regarding usage parameters of a specific user or a group of users.

13. The system according to claim 1, wherein the dispensing system is further configured to communicate with one or more automated dispensing units by wired or wireless routes.

14. The system according to claim 1, further configured to restrict or limit item dispensing based on the determined inventory of said item and/or based on user characteristics.

15. A method for managing inventory of textile items in an automated dispensing system, the method comprising:
detecting by one or more sensors of an inventory management assembly of said dispensing system, one or more parameters related to quality and quantity of textile items stored in and/or dispensed from one or more storage compartments, said sensors are selected from a spatial sensor, a temporal sensor, a visual sensor, a weight sensor and an RFID sensor, said sensors are associated with a gripper assembly and/or with one or more of said storage compartments;
computing, by an inventory management processing module, inventory related data based at least on said one or more parameters; and
providing instructions to the gripper assembly comprising at least one motor, at least one controller, at least one gripper unit, at least one arms, or any combinations thereof, wherein the at least one gripper is movable between said one or more storage compartments, said instructions to said gripper assembly for reaching a selected compartment, retrieving a textile item therefrom and delivering said textile item to a dispensing outlet, based on said computed inventory related data.

16. The method according to claim 15, further comprising providing one or more indications regarding quality and/or quantity inventory of the items.

17. The method according to claim 15, wherein the detecting by the sensors is performed directly or indirectly.

18. The method according to claim 15, wherein the quality parameters comprises type of an item, size of an item, color of an item, condition of an item, defects in an item, frequency of use of an item, life cycle of an item, or any combination thereof; and/or wherein the quantity parameter comprises amount/number of an item in a compartment, amount of an item in a plurality of compartments, amount of item in the entire plurality of compartments, or any combination thereof.

19. The method according to claim 15, further comprising computing and providing indication regarding usage parameters of a specific user or a group of users and/or further comprising restricting or limiting dispensing of an item based on the determined inventory of said item and/or based on user characteristics.

* * * * *